United States Patent [19]
Dailen

[11] 3,785,104
[45] Jan. 15, 1974

[54] PANEL SEALING SYSTEM FOR INTERNAL GLAZING

[75] Inventor: John A. Dailen, Port Clinton, Ohio

[73] Assignee: The Standard Products Company, Cleveland, Ohio

[22] Filed: Nov. 15, 1971

[21] Appl. No.: 198,630

[52] U.S. Cl.............. 52/400, 52/235, 52/402, 52/403, 52/627
[51] Int. Cl............................. E04b 2/62
[58] Field of Search............ 52/400, 214, 627, 52/628, 573, 235, 282, 281, 208, 393, 395, 397, 402, 403, 716, 2; 49/504, 381, 482, 479

[56] References Cited
UNITED STATES PATENTS

| 3,699,735 | 10/1972 | Smith | 52/403 |
|---|---|---|---|
| 3,312,026 | 4/1967 | Rolland | 52/403 |
| 3,604,171 | 9/1971 | Perilstein | 52/400 |
| 3,680,903 | 8/1972 | Hulten | 52/716 |
| 2,596,780 | 5/1952 | Meyers et al. | 52/403 |
| 2,332,852 | 10/1943 | Johnson | 52/717 |
| 2,842,073 | 7/1958 | Huston et al. | 52/393 |
| 3,028,938 | 4/1962 | Schorr | 52/400 |
| 3,342,000 | 9/1967 | Cripe | 52/281 |
| 3,230,677 | 1/1966 | Brown | 52/400 |
| 3,604,170 | 9/1971 | Stoakes | 52/208 |

FOREIGN PATENTS OR APPLICATIONS

| 659,716 | 3/1963 | Canada | 52/393 |
|---|---|---|---|
| 1,440,022 | 4/1966 | France | 52/214 |

Primary Examiner—Frank L. Abbott
Assistant Examiner—Leslie A. Braun
Attorney—James H. Tilberry

[57] ABSTRACT

Means are provided for permitting internal glazing for panel mounting systems of the type wherein elastomeric gasket members which include panel receiving channels therein are disposed about openings in buildings or the like to support thin rigid construction panels in predetermined desired positions. In the subject invention, a plurality of rigid means are molded integrally into at least those gasket members used to support the edges of adjacent construction panels. These rigid means are adapted to be used in affixing the gaskets to associated rigid construction members extending around and/or spanning the opening as well as providing rigidity for the panel mounting gaskets to prevent panel roll out when high negative lateral forces are received against the construction panels.

3 Claims, 4 Drawing Figures

PATENTED JAN 15 1974
3,785,104
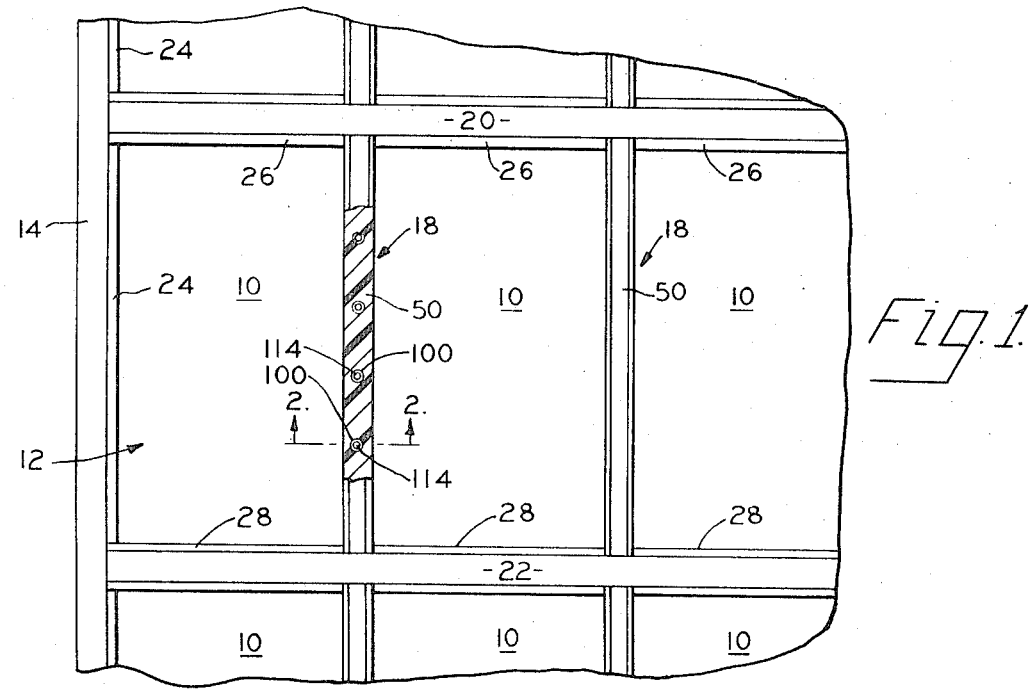
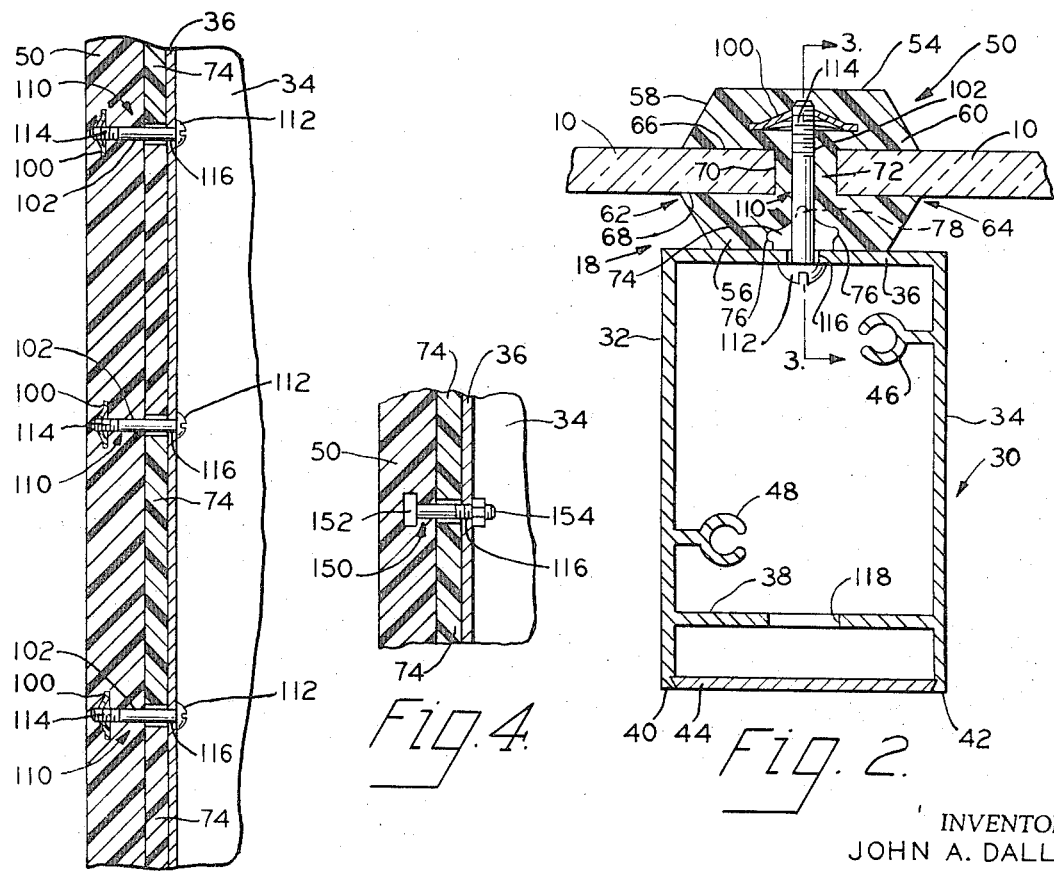
INVENTOR.
JOHN A. DALLEN
BY
Meyer, Tillerry & Body
ATTORNEYS

PANEL SEALING SYSTEM FOR INTERNAL GLAZING

This application pertains to the art of panel mounting systems and more particularly to mounting systems for use with large construction panels which form substantially the entire outside wall area for a building.

The present invention is particularly applicable to window mounting systems wherein an elastomeric gasket member surrounds a window opening and has a continuous groove therein for receiving the edges of the associated window panel, and wherein at least one mullion structural member and a cooperating narrow gasket extend transversely across the opening to divide it into a series of openings. Although the invention will be described with particular reference to such a system, it will be appreciated that the invention has broader applications and may be employed whenever it is desirous of mounting construction panels using narrow elastomeric gaskets, including the horizontal and vertical perimeter of a bay as well as the horizontal and vertical muntins. The invention may be used with strip gaskets, ladder gaskets or grid gaskets. Ladder gaskets include a continuous periphery of rectangular or other shape, an integral muntin cross members extending in only one direction, either horizontal or vertical, in parallel relationship. Grid gaskets include a continuous periphery of rectangular or other shape, and integral muntin cross members extending both horizontal and vertical, and integrally intersecting one another. The present invention may be used anywhere with strip gaskets, and on the periphery or muntin cross members of ladder and grid gaskets.

The elastomeric members which make up these different gaskets generally have a base and a pair of parallel spaced lips defining a continuous panel receiving channel. Usually, the base has a second channel extending along one side thereof to allow at least one of the lips to be sufficiently flexible so that it may be moved aside to permit insertion of a panel in the panel receiving channel. A lock strip is then forced into the second channel to force the flexible lips into sealing engagement with the panel and to lock the panel into position.

Oftentimes the building wall opening is substantially larger than the individual panels so that a plurality of closely spaced coplanar panels are necessarily required to provide an opening enclosure. In this type of construction, rigid mullion structural members and associated elastomeric gaskets, i.e., ladder and grid gaskets, are utilized to mount the adjacent coplanar panels. A rigid mullion structural member is mounted to transversely span the opening directly behind each of the integral muntin cross members of the gasket. Initially the integral muntin cross members were in no way affixed or connected to the associated of the mullion structural members. The result was a tendency for the construction panels to bow outwardly when subjected to high negative lateral forces. This bow out resulted in the danger of broken panels or inefficient panel seals. To overcome this, the integral muntin cross members were rigidly affixed to the associated of the mullion structural members. Because the gaskets are disposed on the outside of the building from the mullion structural members and, since the affixing step occurred after the installation of the construction panels themselves, the affixing work had to be done from outside the building structure. In buildings having many stories, such as commercial office buildings, this has created a problem in requiring special scaffolding structures to be erected in order to permit workmen to complete the affixing work. This added time and cost to the panel mounting work, as well as adding an undesirable element of danger to the work.

Another problem which has caused difficulty in permanently supporting these adjacent coplanar panels has been "panel roll out". Panel roll out is a term of art employed to denote a condition wherein a construction panel is forced from the desired tight sealing and supporting relationship with the associated gasket members by substantial negative lateral forces acting thereon. The result of panel roll out is, as above, leaking and inefficient panel seals as well as broken panels.

Still another problem which has been encountered in prior glazing systems has been the undesirable transmission of temperature changes occurring in the atmosphere or outside environment into the buildings through the rigid mullion structural members. These members have heretofore been partially exposed to both the inside and outside of the buildings themselves. To combat this temperature transmission, it has been necessary to provide separate thermal insulating means in the structural mullion members which added cost to the overall glazing system.

The present invention contemplates means for permitting internal glazing of construction panels which overcomes all of the above referred problems and others and is simple to manufacture, easy to use, and readily adaptable to any building design requiring gasket members for mounting thin rigid construction panels.

In accordance with the present invention, there is provided an elastomeric panel mounting gasket including a body portion and a pair of spaced apart parallel lip members defining a continuous panel receiving channel longitudinally therealong. The body portion has a plurality of rigid means disposed therein for use in combination with other means for mounting the body portion to an adjacent rigid construction member.

In accordance with another aspect of the present invention, the rigid means extend from the base into the lip members for adding rigidity to the mounting gasket member in order to prevent panel roll out when high lateral forces are received against the panel.

In accordance with another aspect of the present invention, the rigid means comprise a plurality of spaced apart generally flat elements in the base which extend sidewardly into the outermost lip member and parallel to at least a portion of the panel receiving channel.

In accordance with yet another aspect of the present invention, an elongated elastomeric panel receiving gasket is provided with internal means which cooperate with means extending to or from the rigid construction member to impart the rigidity of the construction member to the gasket.

In accordance with still another aspect of the present invention, the mounting gasket is positioned along its associated structural mullion member so that none of the mullion member is exposed to the environment outside the building.

The principal object of the present invention is the provision of new and improved means for permitting internal glazing for a panel mounting system.

Another object of the present invention is the provision of means for permitting internal glazing wherein receiving means adapted to engage elongated mechanical fasteners are molded integral with the gasket member.

Still another object of the present invention is the provision of means for permitting internal glazing which provides rigidity for the gasket member in retaining construction panels in place.

Still another object of the present invention is the provision of means for permitting internal glazing wherein there is no metal exposed to the elements to conduct and transmit temperature changes in the environment to the inside of the building.

Another object of the present invention is the provision of means for permitting internal glazing in which the receiving means and rigidity providing means are comprised of the same element which performs two complimentary functions.

Yet another object of the present invention is the provision of means for permitting internal glazing which is readily adaptable to a variety of different mounting systems employing elastomeric panel gasket members.

The invention may take physical form in certain parts and arrangements of parts, a preferred embodiment of which will be described in detail in this specification and illustrated in the accompanying drawings which form a part hereof and wherein:

FIG. 1 is a partial side view showing a building having window panels mounted therein in accordance with a preferred embodiment of the invention and with a portion of the mounting gaskets removed for clarity of illustration;

FIG. 2 is a cross sectional view taken along lines 2—2 in FIG. 1;

FIG. 3 is a second cross sectional view of the mounting system of the subject invention taken along lines 3—3; and, FIG. 4 is a view similar to that of FIG. 3 showing a second embodiment of the subject invention.

Referring now to the drawings wherein the showings are for the purposes of illustrating a preferred embodiment of the invention only, and not for purposes of limiting same, the FIGURES show a plurality of window panels 10 mounted to form the outside wall 12 of a multi-story building. In FIG. 1, wall 12 includes a corner area 14. A plurality of mullion areas generally designated 18 extend transversely across the opening between consecutive floors 20,22 of the building in a geneally vertical direction. Floors 20,22 may be constructed in any known manner and oftentimes include poured concrete panels at least at the extremities thereof and similarly, the members comprising corner area 14 are also oftentimes poured concrete. In the preferred embodiment, it will be appreciated that the intention is to present as much window area on wall 12 as possible. It will also be appreciated that the number of mullion area 18 required is dependent upon the particular dimensions of the building and window panels. The mounting systems for the outside edges and top and bottom edges of panels 10 are generally shown by numerals 24,26 and 28 respectively. It is to be understood that these systems may be of the type hereinafter described or of any other type generally associated with outside edges of window of construction panels in buildings and using elastomeric gasket members. The other mounting systems which may be associated with these edges do not form a part of the present invention and are therefore not specifically described herein. The subject invention is adaptable for use with any of these systems as will hereinafter become apparent.

More specifically and with reference to one of mullion areas 18, it being understood that the other mullion areas are identical thereto unless otherwise specifically noted, it will be seen from the FIGURES that area 18 is partially comprised of an elongated mullion structural member generally designated 30 formed from any convenient rigid material which, in the preferred embodiment, comprises an extruded aluminum member. The mullion structural member includes a pair of oppositely disposed side walls 32,34 and an end wall 36 which forms a gasket receiving surface as will be hereinafter more fully described. A side wall support member 38 extends between side walls 32,34 adjacent the ends thereof and provides rigidity for the mullion structural member. It will be appreciated, however, that the mullion structural member may be of any alternative design required for the specific job requirements. A pair of cover plate lips 40,42 are disposed longitudinally along side wall portions 32,34 respectively and releasably receive a cover plate 44 in a known fashion. Cover plate 44 is in the preferred embodiment, an extruded aluminum element having a length substantially coextensive with the length of the associated mullion structural member and allows access into the inside of the mullion structural member for mounting a gasket member as will also hereinafter be more fully described. In the arrangement shown, mullion structural member 30 includes fastener chases 46,48 for receiving fasteners to tie the entire system together in a known fashion. Although the section for FIG. 2 has been taken at a vertical mullion area, it will again be appreciated that the feature of the present invention may also be used at similar horizontal areas as well as the periphery of bays and at the periphery of ladder or grid gaskets.

A panel mounting gasket generally designated 50 cooperates with mullion structural member 30 to complete the structure of area 18. This gasket includes an elongated body portion which is most advantageously formed from an elastomeric material such as neoprene. The body portion includes a top area 54, bottom area 56 which is also the gasket mounting surface and side portions 58,60. Disposed in side portions 58,60 are longitudinally extending panel receiving channels 62,64 respectively. Each of these channels include side walls 66,68 and a bottom wall 70. Bottom walls 70 are spaced apart by a rib-like area 72. Bottom area 56, and in a known fashion, includes a channel area adapted to receive a locking strip 74 including a pair of lateral projections 76 and an inward projection 78. Locking strip 74 is used to bias side walls 68 of the panel receiving channels into a panel gripping relationship with the associated panels 10. Again, this is done in a known manner. In other words, the above described structure defines an elastomeric panel mounting gasket having a body portion and opposed continuous panel receiving channels defined by spaced apart parallel lip members.

In accordance with the subject invention, a plurality of locking means generally designated 100 are disposed along the gasket adjacent top area 54. In the preferred embodiment, these locking means are stamped from sheet metal and are commonly known as "speed nuts". These nuts are most advantageously integrally molded, although other means of installation may be used, into the gasket which also includes an elongated mechanical fastener receiving hole 102 associated with each of the locking nuts. These holes extend transversely through the gasket in areas 54,56 and rib 72 and may also be integrally molded with the gasket. It should be noted that the diameter or width of nuts 100 are such to extend sidewardly over a portion of each channel 62,64. This dimension provides stability for the overall structure as will become apparent hereinafter. Nuts 100 may be spaced along the gasket as frequently as desired as best shown in FIG. 1 in order to fulfill the necessary strength criteria for the particular mounting involved.

To utilize the concepts of the subject invention, and as shown in FIG. 1, a ladder gasket is first fabricated which includes the gaskets employed by systems 24,26 and 28 and gasket 50 of the subject invention. This ladder gasket is assembled in a known fashion and includes sufficient gasketing so as to permit mounting of a plurality of the horizontally adjacent window panels 10. Usually, a gasket of this type is fabricated at the factory to the purchasers specifications as dictated by the building design itself.

The ladder gasket is first placed to extend around the opening with the gaskets included in systems 24,26 and 28 being respectively positioned in association with corner area 14 and floors 20,22. Following this, the individual window panels 10 may be installed with the edges thereof being received in the panel receiving channels of the associated panel mounting gaskets and locked in place by convenient means such as for example, elastomeric locking strips 74. It should be noted that (FIG. 3) separate lengths of locking strip 74 are used between the adjacent receiving holes 102 at each side thereof to eliminate the need for drilling passage holes therethrough to facilitate the passage of elongated fastening elements through holes 102 as will hereinafter be more fully described. Specifically, and with reference to each mullion 18 and associated panel mounting gasket 50, the side edges of panels 10 are received in channels 62,64 and locking strips 74 positioned to bias side walls 68 into a clamping condition.

A mullion structural member 30 may then be positioned and secured between floors 20,22 in a known fashion or by the use of chases 46,48 in vertical alignment with each gasket 50 so that end wall 36 faces outwardly of the building toward the associated gasket. All of the above steps may be performed from inside the building. A plurality of elongated machine screws 110 are then passed through end wall 36 so that head portions 112 engage the inside portion of the end wall and body portions 114 pass through holes 102 into locking engagement with nuts 100. To facilitate this mounting, the mullion structural member includes a plurality of body portion receiving holes 116 spaced along the end wall thereof in a coaxial relationship with holes 102 and a plurality of coaxial access holes 118 in side wall support member 38. Holes 116, 118 may be drilled at installation or prior thereto, whichever is deemed most expeditious to complete a particular installation.

As is apparent, the placement of screws 110 may easily be accomplished from within the building by passing a screwdriver or other required tightening means through access holes 118 into engagement with heads 112. Following tightening of the screws so that bottom area 56 of the gasket is brought into a close-fitting relationship with end wall 36, cover plate 44 may be installed in order to present an appealing overall appearance for the mullion structural member from inside the building. Because the gasket is constructed from an elastomeric material, and even with the locking strip in position, it is possible to move side portions 58,60 outwardly so that side walls 66 of the panel receiving channels are no longer in the tight-fitting relationship with the associated window panels. This problem is, and as hereinabove discussed, not realized until a substantial negative lateral force of the magnitude and type generated during a severe storm is received against the panels. This type of force does not have the affect of pushing the panels in, but rather, has the affect of forcing the window panels on the opposite side of the building outwardly. Specifically, and with these severe forces, side portions 58,60, in the absence of the invention, flex outwardly so that the panels are essentially rolled out of their mounted positions. The result, of course, can be broken mounting seals and even broken construction panels. As nuts 100 extend partially over channels 62,64 they act as rigid retaining means to prevent side portions 58,60 from being flexed outwardly so as to prevent this roll out.

According to a second embodiment of the subject invention, elongated threaded stud bolts having enlarged heads are integrally molded into the gasket, one of these installations being shown in FIG. 4. In that FIGURE, stud bolt 150 is shown as having an enlarged head portion 152 and an elongated threaded body or shank portion 154. The head portion is disposed in top area 54 and is of a diameter sufficient to extend sidewardly over a portion of each channel 62,64. This, of course, provides stability for the overall structure as hereinabove described. The body portion is of sufficient length to extend transversely through a portion of top area 54, rib 72 and outwardly from bottom area 56. In using this embodiment, the installation steps remain the same as those hereinabove described except that body portions 154 are received through receiving holes 116 and retained in position by means of nuts threadably received thereon.

The invention has been described with reference to the preferred embodiment. Obviously modifications and alterations will occur to others upon the reading and understanding of this specification. It is my intention to include all such modifications and alterations insofar as they come within the scope of the app ended claims or the equivalents thereof.

Having thus described my invention, I now claim:

1. An elongated elastomeric panel mounting gasket affixed to an elongated rigid structural member having a gasket receiving surface, said gasket including a flat body portion, said body portion having at least a pair of spaced-apart lips defining a longitudinally continuous panel receiving channel having a channel bottom, said body portion including a rib portion integral with said lips and extending past said channel bottom, said body portion having a mounting surface and an opposite surface, a longitudinal lock strip receiving groove extending into said body portion from said mounting surface adjacent one of said lips receiving a lock strip therein to lock said one lip against a panel received in said channel, the improvement comprising; rigid stiffening means molded integrally into said body portion opposite said lock strip receiving groove and on the opposite side of said panel receiving channel from said lock strip receiving groove, said rigid stiffening means substantially spanning said rib portion and extending into the other of said lips past said channel bottom for stiffening said other lip against bending outwardly away from said one lip, a plurality of longitudinally-spaced fastener receiving holes in said body portion extending through said rib portion from said lock strip receiving groove to said rigid stiffening means, and a plurality of fasteners extending through said fastener receiving holes and being affixed at one end to said rigid stiffening means and at their other end to said structural member.

2. The improvement of claim 1 wherein said rigid stiffening means comprises a plurality of longitudinally-spaced plate members having threaded fastener securing holes therein aligned with said fastener receiving holes in said body portion.

3. The improvement of claim 1 wherein said rigid stiffening means comprises a plurality of longitudinally-spaced substantially flat head portions on fasteners having shank portions occupying said fastener receiving holes in said body portion.

* * * * *

UNITED STATES PATENT OFFICE
CERTIFICATE OF CORRECTION

Patent No. 3,785,104  Dated January 15, 1974

Inventor(s) John A. Dallen

It is certified that error appears in the above-identified patent and that said Letters Patent are hereby corrected as shown below:

On the cover page, under the heading "UNITED STATES PATENT" change "DAILEN" to --- DALLEN ---;

On the cover page, following the heading "Inventor" change the inventor's surname "Dailen" to --- Dallen ---.

Signed and sealed this 24th day of September 1974.

(SEAL)
Attest:

McCOY M. GIBSON JR.
Attesting Officer

C. MARSHALL DANN
Commissioner of Patents